United States Patent
Wang

(10) Patent No.: US 8,964,127 B2
(45) Date of Patent: Feb. 24, 2015

(54) USER-SENSING REMOTE CONTROL SYSTEM AND METHOD

(75) Inventor: Haohong Wang, San Jose, CA (US)

(73) Assignee: TCL Research America Inc., Santa Clara, CA (US)

(*) Notice: Subject to any disclaimer, the term of this patent is extended or adjusted under 35 U.S.C. 154(b) by 0 days.

(21) Appl. No.: 13/559,595

(22) Filed: Jul. 27, 2012

(65) Prior Publication Data
US 2014/0028920 A1    Jan. 30, 2014

(51) Int. Cl.
H04N 5/44    (2011.01)

(52) U.S. Cl.
USPC ............... 348/734; 706/20; 340/4.31; 725/46

(58) Field of Classification Search
CPC .................................................. H04N 5/4403
USPC ................. 706/20; 340/4.31; 725/46
See application file for complete search history.

(56) References Cited

U.S. PATENT DOCUMENTS

| | | | |
|---|---|---|---|
| 6,493,688 B1 * | 12/2002 | Das et al. ........................ | 706/20 |
| 8,172,675 B2 | 5/2012 | Migos et al. | |
| 8,495,680 B2 * | 7/2013 | Bentolila et al. ................ | 725/46 |
| 2012/0143693 A1 | 6/2012 | Chung et al. | |
| 2013/0176102 A1 * | 7/2013 | BianRosa et al. ............ | 340/4.31 |

FOREIGN PATENT DOCUMENTS

JP    2011-95814    5/2011

* cited by examiner

Primary Examiner — Jefferey Harold
Assistant Examiner — Sihar Karwan
(74) Attorney, Agent, or Firm — Anova Law Group, PLLC

(57) ABSTRACT

A method is provided for a user-sensing remote control system including a TV and a remote control. The method includes obtaining sensing data from a plurality of sensors in the remote control related to a user of the remote control, pre-processing the sensing data, and determining a user identity space containing a plurality of possible user identities of the user using a predetermined statistical algorithm. The method also includes determining whether there is a dominant possible user identity; when it is determined that there is no dominant possible user identity, selecting one or more possible user identities from the user identity space and updating the user identity space until there is a dominant possible user identity; and when it is determined that there is a dominant possible user identity, presenting the dominant possible user identity as the identity of the user to other applications.

22 Claims, 5 Drawing Sheets

USER-SENSING REMOTE CONTROL SYSTEM AND METHOD

FIELD OF THE INVENTION

The present invention relates to the field of television and user interface technologies and, more particularly, to remote control systems and methods with advanced user identification techniques.

BACKGROUND

With the recent advances in device and service personalization and recommendation, implicit user identification technology is getting more popular. Instead of asking a user to enter a user name and a password, which makes the user experience cumbersome, technologies have been developed to implicitly identify the user. For example, some technologies use GPS and accelerometers built inside mobile devices to analyze user behavior and operation patterns on the device in order to discover the current user. For TVs, solutions are developed based on computer vision for face detection and recognition technique to discover user identity. However, it may be difficult for ordinary users to allow a video camera staring at them during the supposedly relaxing TV watching time. Also, there may be privacy concerns when those TVs are placed in bedrooms.

Further, some technologies try to use remote control to send certain user information to TVs. However, such existing technologies often use simple techniques and in general do not consider the user's reaction to TV contents. Such approach may overlook the fact that the human being's mood can be significantly affected by the content he/she is watching and the mood has impact on the user behavior as well. Further, when the traditional TVs are eventually replaced by smart TVs, the user's reaction to a smart TV and the recommendations from the smart TV often contain plenty implicit but valuable feedback which tells who the user is.

The disclosed methods and systems are directed to solve one or more problems set forth above and other problems.

BRIEF SUMMARY OF THE DISCLOSURE

One aspect of the present disclosure includes a method for a user-sensing remote control system including a TV and a remote control. The method includes obtaining sensing data from a plurality of sensors in the remote control related to a user of the remote control, pre-processing the sensing data, and determining a user identity space containing a plurality of possible user identities of the user using a predetermined statistical algorithm. The method also includes determining whether there is a dominant possible user identity; when it is determined that there is no dominant possible user identity, selecting one or more possible user identities from the user identity space and updating the user identity space until there is a dominant possible user identity; and when it is determined that there is a dominant possible user identity, presenting the dominant possible user identity as the identity of the user to other applications.

Another aspect of the present disclosure includes a user-sensing remote control system containing a remote control and a TV. The user-sensing remote control system includes a plurality of sensors, a sensing data processing module, a recommendation engine, and a user identity analyzer. The plurality of sensors are configured in the remote control for obtaining sensing data related to a user of the remote control. The sensing data processing module is configured to pre-process the sensing data and to determine a user identity space containing a plurality of possible user identities of the user using a predetermined statistical algorithm. Further, the recommendation engine is configured to provide one or more recommendation list on the TV to the user. The user identity analyzer is configured to determine whether there is a dominant possible user identity; when it is determined that there is no dominant possible user identity, to select one or more possible user identities from the user identity space and to update the user identity space until there is a dominant possible user identity; and when it is determined that there is a dominant possible user identity, to present the dominant possible user identity as the identity of the user to other applications.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
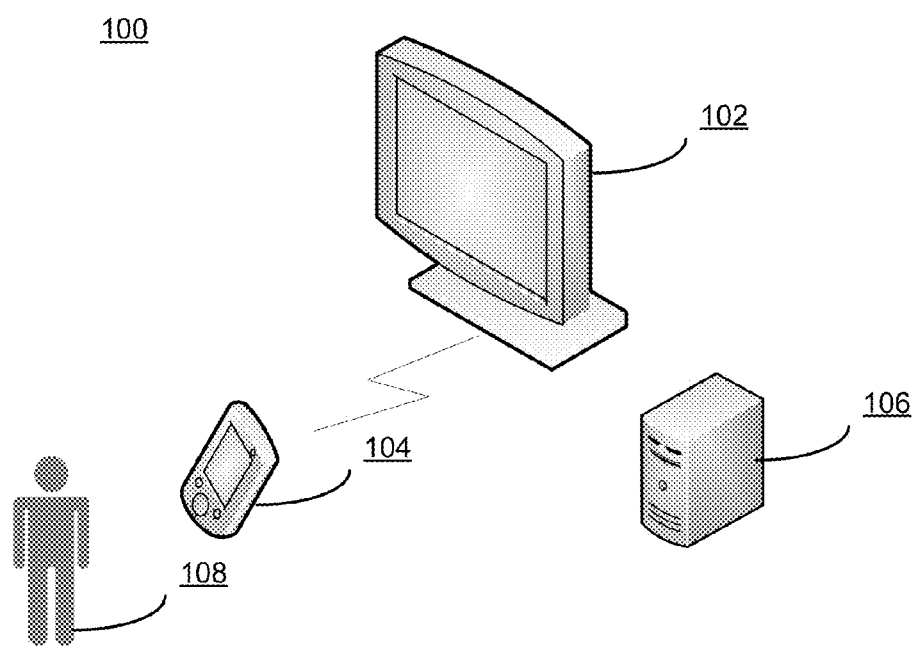
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, and a user 108. Optionally, environment 100 may include a network device 106.

TV 102 may include any appropriate type of TV, such as plasma TV, LCD TV, projection TV, non-smart TV, smart TV, or mobile TV. TV 102 may also include any devices that with display functionality. Remote control 104 may include any appropriate type of remote control that communicate with and control the TV 102, such as a customized TV remote control, a universal remote control, a tablet computer, a smart phone, or any other computing device capable of performing remote control functions. Remote control 104 may include various sensors, such as accelerometer, gyroscope, depth sensor, and infrared optical sensor, etc., to collect certain information about or related to the user 108 and to provide the collected information for further processing. In certain embodiments, the TV 102 and remote control 104 can be parts of an integrated device, such as a mobile phone or tablet, i.e., the TV 102 and the remote control 104 coincide with each other.

To watch TV 102, the user 108 may first pick up the remote control 104, hold the remote control 104, and then use the remote control 104 to control TV 102. During this process, the topological relationship between the TV and the user who is holding the remote control can be estimated, such as the user's height, position and strength in picking up the remote control, the user's position in watching TV, and so on.

Further, the optional network device 106 may include any appropriate type of computing or consumer electronic device to facilitate the communication, data storage, and data processing between the remote control 104 and TV 102. TV 102, remote control 104, and network device 106 may communicate with each other through one or more communication networks.

Figure 2:
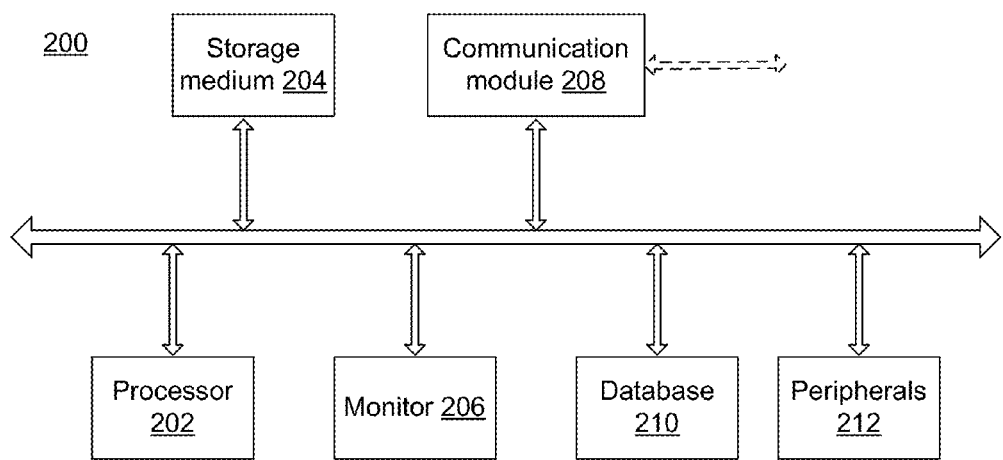
FIG. 2 illustrates an exemplary computing system consistent with the disclosed embodiments.

TV 102 and/or remote control 104 may be implemented on any appropriate computing circuitry platform. FIG. 2 shows a block diagram of an exemplary computing system 200 capable of implementing TV 102 and/or remote control 104.

As shown in FIG. 2, computing system 200 may include a processor 202, a storage medium 204, a monitor 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
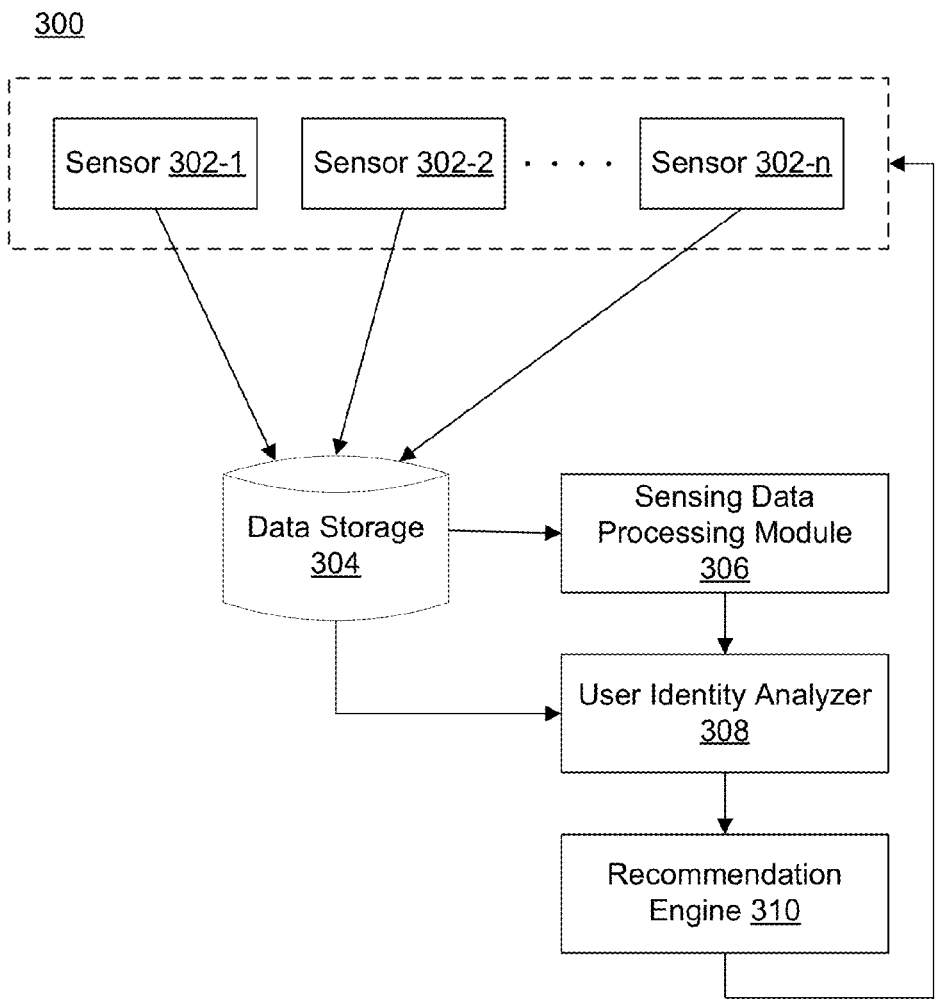
FIG. 3 illustrates an exemplary user-sensing remote control system consistent with the disclosed embodiments.

FIG. 3 illustrates an exemplary user-sensing remote control system 300 consistent with the disclosed embodiments. As shown in FIG. 3, system 300 includes a plurality of sensors 302-1, 302-2, ..., 302-n, a data storage 304, a sensing data processing module 306, a user identity analyzer 308, and a recommendation engine 310. Certain components may be omitted, and other components may be added.

The plurality of sensors 302 may include any physical or virtual devices capable of capturing certain information for further processing. For example, the plurality of sensors 302 may include physical sensors, such as buttons, accelerator, and gyroscope in the remote control 104, and virtual sensors such as the user interface (UI) components (e.g., icons and menus) shown on the TV display. The data storage 304 may include any form of storage, such as physical memory in remote control 104, TV 102, or even in devices or services in the network.

Further, the sensing data processing module 306, user identity analyzer 308, and recommendation engine 310 are configured to perform various processing based on the data from the plurality of sensors 302 and data storage 304. For example, the sensing data processing module 306 may pre-process the sensing data from the sensors 302 with noise removal and data classification, and process user identity information using certain predetermined algorithms.

The user identity analyzer 308 may use the processed data to determine the current user who is holding the remote control 104 based on the progressive interaction between TV recommendation and the user's reaction. The recommendation engine 310 may recommend TV program shown to the user in various formats, such as EPG, recommended title lists, or a few channels. The recommendation engine 310 may also feedback information to remote control 104.

The user-sensing remote control system 300 may be implemented on remote control 104 and/or TV 102. That is, the functionalities of the user-sensing remote control system 300 can be distributed between the remote control 104 and TV 102, based on particular applications, the usage scenario, and fashion of design.

For example, the remote control 104 may contain the plurality of sensors 302, and the data captured from sensors 302 are transmitted to TV 102 or network device 106 for further processing. In this configuration, the remote control 104 is a thin user-sensing terminal, and the data processing is performed by other devices.

Alternatively or optionally, the remote control 104 may have certain computational capabilities to pre-process collected data, remove noises, and to derive characterized subset of data for further processing by other devices.

The remote control 104 may also have strong computation capabilities. For example, when remote control 104 is a mobile phone or a tablet computer, remote control 104 may include all components of the user-sensing remote control system 300 shown in FIG. 3. TV 102 may be used as display for rendering or for video streaming and rendering. In this scenario, TV 102 can be a part of the remote control 104.

In operation, a variety of data are collected by remote control 104 (i.e., the plurality of sensors 302). The collected data from sensors 302 are processed to identify the current viewer, and the content that matches the viewer's preference are recommended to the viewer. When the viewer makes certain selections, the sensors 302 detect the selections and then the user identity analyzer 308 refines the decision of the current user identity. The user identity can then be used for the recommendation engine 310 to present a recommend list to the user via TV 102. If the earlier decision is different from the refined decision, the recommendation list will be updated accordingly.

Thus, after a few iterations, the user identity may be accurately determined and desirable recommendations can be made to the viewer/user. That is, the user-sensing remote control system 300 is a progressive system, based on a progressive model of user discovery matches normal human being's judgment system. The judgment of user-sensing remote control system 300 goes from blur to clear progressively with more and more information. The system 300 learns the user behavior and adjusts system parameters to adapt to the specific household.

Figure 4:
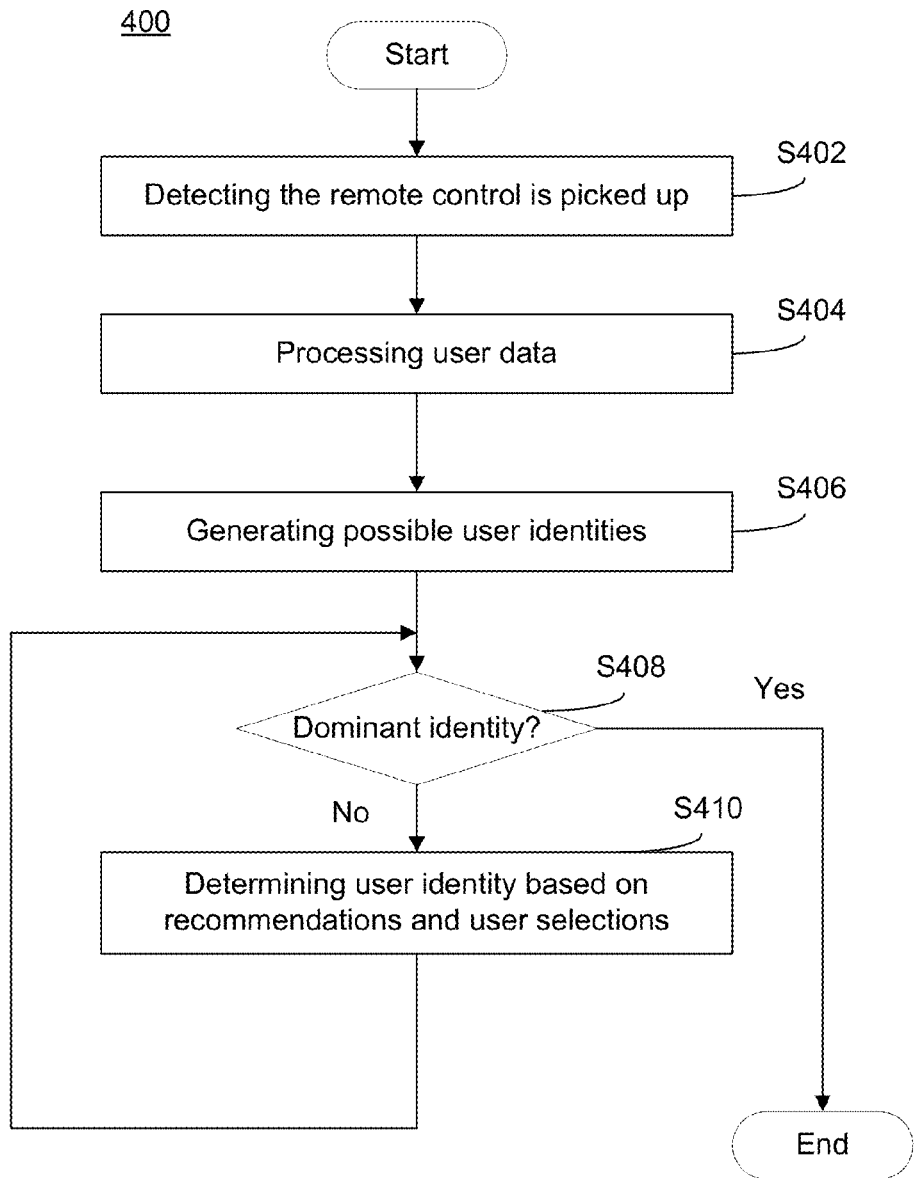
FIG. 4 illustrates an exemplary operating process of a user-sensing remote control system consistent with the disclosed embodiments.

FIG. 4 illustrates an exemplary operating process of the user-sensing remote control system 300 consistent with the disclosed embodiments. As shown in FIG. 4, at the beginning, the event that the user 108 picks up the remote control 104 is detected (S402). The plurality of sensors 302 may also collect data about the user 108, the system 300, and interactions between the user 108 and system 300.

For example, remote control 104 may collect sensing data and provide collected data such as time of watching TV by the user, content category of the TV watched, strength in pickup the remote control, strength in button press in remote control, position of seat selection, key press sequence, and content category menu selection, etc. Other information may also be included.

Further, the collected data may be processed by, for example, the sensing data processing module 306 (S404). Sensing data processing module 306 may process the collected data and classify the user into one or more particular predetermined categories. For example, in a typical household, a typical number of household members maybe be in the range of 1-5, depending on actual regions and local cultures. The categories of the household members (users or viewers)

may be determined according to, for example, age and sex into (Kid, Male); (Kid, Female); (Teenager, Male); (Teenager, Female); (Adult, Male); (Adult, Female); (Elder, Male); and (Elder, Female). Other categories may also be used.

The sensing data processing module 306 may use certain collected data to indicate the user's age and/or sex, such as the time of watching TV, content category, strength in pickup the remote control, and strength in button press in remote control. For example, during the work-hours, typically elders or housewives are the dominant TV viewers (the time of watching TV). The kids' content can be easily distinguished from others, and often male's taste is different from female's (content category). Also, the kids and elders typically have different patterns than adults and teenagers, and often male and female can be distinguished via this factor (strength in pickup the remote control). Similarly, the kids and elders typically have different strength than adults and teenagers, same do males and females (strength in button press in remote control). The strength information may be obtained from the built-in accelerator in remote control 104.

Figure 5:
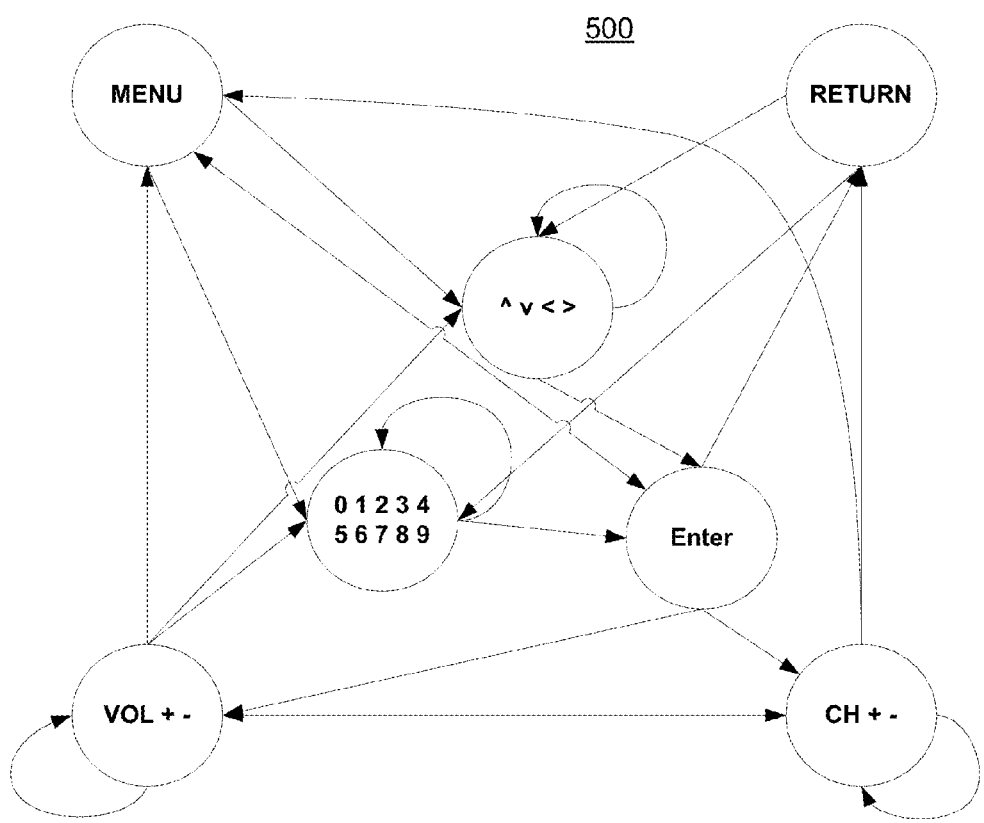
FIG. 5 illustrates an exemplary key transferring pattern consistent with the disclosed embodiments.

The sensing data processing module 306 may also use certain collected data to indicate or classify a specific person (may be unrelated to the matter of age and/or sex), such as position of seat selection, key press sequence, and content category menu selection. For example, for some families, the seats are fixed for members, even not so strict, some people are used to choose a certain seat at home as a comfortable position, thus the position may have certain indication on the user identity (position of seat selection). The user's behavior on the remote control keys/buttons may be used to characterize a user (key press sequence). FIG. 5 illustrates an exemplary key transferring pattern 500 consistent with the disclosed embodiments.

As shown in FIG. 5, the key transferring pattern 500 includes a plurality of nodes (i.e., circles) and arrowed curves between nodes. The nodes may represent keys pressed and the arrowed curves may represent a relationship or transition between the originating key press to next key press. That is, for each arrowed curve, the destination node refers to the key just being pressed and the originating node refers to the key pressed earlier than that. The probabilities of these node transitions form a key transferring pattern, which may then be used for the user behavior analysis.

Returning to FIG. 4, during processing the collected data, other information, such as user's content category menu selection, may also be used to indicate a specific user. The content category menu selection may be treated as a strong explicit indication from the user to swap a recommendation list to a specific category. The category selected by the user can be linked as one of the user's preference.

The sensing data processing module 306 may perform certain algorithms to pre-process the collected sensing data to reduce the amount and/or types of the sensing data. For example, the sensing data processing module 306 may perform a quantization operation, e.g., mapping random data into a pre-defined fixed-size data set. For example, the seat positions at home should be limited to a pre-defined data set. The quantization operation may remove data noises and make further data processing much easier. The sensing data processing module 306 may use certain predetermined algorithm, such as a K-meanings clustering, to handle the quantization processing.

The sensing data processing module 306 may also perform a dimensional reduction operation, e.g., linking the data to a user category or a limited number of user categories. For example, from a specific sensing data, the age and sex information of the user can be determined. The sensing data processing module 306 may perform the dimension reduction operation using a knowledge base whose parameters are obtained from an early stage training process with mass number of human beings, such that the user identity range can be substantially narrowed down.

More particularly, the sensing data processing module 306 may use Bayesian inference to derive the posterior probability according to Bayes' rule. For example, to derive a user's age category based on his/her TV watching timeslot, provided that P(A) denotes the probability that the user is an elder, P(B) denotes the marginal likelihood that people watch TV in the afternoon, and P(B|A) refers to the likelihood or probability that an elder watches TV in the afternoon, then accordingly to the Bayer's rule:

$$P(A \mid B) = \frac{P(B \mid A) P(A)}{P(B)}, \qquad (1)$$

The posterior probability P(A|B) is thus obtained, which tells the probability of the user to be an elder given the observation that the user is watching TV in the afternoon. The P(A), P(B) and P(B|A) can be obtained either from the training or from certain model evidence, while P(A|B) can be calculated to tell the likelihood of the particular user category under a certain condition.

Further, the Equation (1) may be extended to multiple observations:

$$P\!\left(A \mid B \prod_{i=1}^{p} C_i\right) = \frac{P(A \mid B) \prod_{i=1}^{p} P(A \mid C_i)}{[P(A)]^{p-1}}, \qquad (2)$$

where p is the number of multiple observations and the multiple observations are all independent incidents. Thus, the probability of the user's age/sex may be derived based on the relevant sensing data from various sources. The dimension of input data may be effectively reduced.

After the user data is processed (S404), the possible user identities may be generated (S406). For example, after the quantization operation and the dimensional reduction operation, the sensing data processing module 306 may represent the user identity space (i.e., a set of possible user identities and/or identity related parameters) with the following vector format:

$$<X> = \{x_1, x_2, \ldots, x_n\},$$

where $x_1, x_2, \ldots, x_n$ represent independent components, such as most possible user age/sex, user's seating position, user's mood, and so on. From time point of view, $X_t$ at time t represents the probability of the user identity at that time. For example, on Monday afternoon 2 PM, the probability of a little girl seats at position 2 to watch action movie is 0.1%.

The sensing data processing module 306 may use a mixture of K Gaussian distributions (typically K>1) to model and represent the user identity, where each Gaussian is weighted according to the frequency with which it belongs to the specific category. This is aligned to a normal family condition that each member has his/her own spectrum in the home entertainment life, and the pattern can be modeled by a Gaussian distribution. Thus, the probability that the user identity $X_t$ at time t can be estimated as:

$$P(X_t) = \sum_{i=1}^{K} w_{i,t} \frac{1}{\sqrt{2\pi}\,\sigma_i} e^{-\frac{1}{2}(X_t - \mu_{i,t})^T \sum^{-1}(X_t - \mu_{i,t})}, \quad (3)$$

where K is total number of Gaussian distributions, i is number of the distribution, $w_{i,t}$ is the normalized weight, $\mu_t$ and $\sigma_t$ are the mean and the standard deviation of the i-th distribution. The multiple types of observations are combined into the user identity space using the mixture Gaussian algorithm as a predetermined statistical algorithm.

The sensing data processing module 306 may determine the most influential distribution in the mixture of distributions and use such information to determine if the current user has a specific identity or not. Heuristically, the Gaussian distributions with the most supporting evidence and the least variance may provide greater indication of certain user identity. The sensing data processing module 306 may sort the K distributions based on the value of w/σ and maintain an ordered list, e.g., keeping the most likely distributions on top of the ordered list and leaving less probable state-transient distributions to bottom of the ordered list.

The most likely distribution models for a content category are obtained by $$B = \arg\min_b (\Sigma_{j=1}^b w_j > T), \quad (4)$$

where the threshold T is the fraction of the total weight given to a specific category. The current user in evaluation is checked against the existing K Gaussian distributions to detect if the distance between the mean of a distribution and the current pixel intensity is within m (e.g., m=3) times of standard deviation of this distribution. If none of the K distributions succeeds in the evaluation, the least probable distribution which has the smallest value of w/σ is replaced by a new Gaussian distribution with the current value as its mean, and a pre-assigned high variance, and low prior weight. Otherwise if the matched distribution is one of the B distributions, the user identity is marked.

To keep the model adaptive, the model parameters are continuously updated using the next event of TV watching. For the matched Gaussian distribution, all the parameters at time t are updated with this new value $X_t$. In addition, the prior weight is updated by $$w_t = (1-\alpha) w_{t-1} + \alpha, \quad (5)$$

and the mean and variance are updated by $$\mu_t = (1-\rho)\mu_{t-1} + \rho X_t, \quad (6)$$

and $$\sigma_t^2 = (1-\rho)\sigma_{t-1}^2 + \rho(X_t - \mu_t)^2, \quad (7)$$

where α is the learning rate controlling adaptation speed, 1/α defines the time constant which determines change, and ρ is the probability associated with the current user, scaled by the learning rate α, and ρ can be represented by $$\rho = \alpha \cdot \frac{1}{\sqrt{2\pi}\,\sigma_t} e^{-\frac{(X_t - \mu_t)^2}{\sigma_t^2}}. \quad (8)$$

For unmatched distributions, the mean $\mu_t$ and variance $\sigma_t$ remain unchanged, while the prior weight is updated by $$w_t = (1-\alpha) w_{t-1}. \quad (9)$$

Thus, with this updating algorithm, the original identity distribution remains in the mixture until it becomes the least probable distribution and a new identity is observed. So if this static identity happens to change, the previous identity distribution can be reincorporated into the model. Further, although the sensing data processing module 306 may map the collected sensing data to the user identity space and determine a dynamic identity distribution in all instances of the identity space, the sensing data processing module 306 may determine that a single user may have a few instances in the user identity space. The sensing data processing module 306 may provide such information to the user identity analyzer 308.

That is, after the possible user identities are generated by using the above distribution model, the user identity analyzer 308 may further determine a user identity using the information provided by the sensing data processing module 306 based on a progressive interaction model.

The user identity analyzer 308 may determine whether any of the identities provided by the sensing data processing module 306 is dominant (S408). For example, the user identity analyzer 308 may determine whether a user identity is associated with a probability greater than a predetermined threshold, such as approximately 90%. If the user identity analyzer 308 determines that a particular user identity is dominant (S408, Yes), the particular user identity may be considered as the result user identify and the process 400 completes. The result user identity may then be used to present recommend lists to the user.

On the other hand, if the user identity analyzer 308 determines that no particular user identity is dominant (S408, No), the user identity analyzer 308 may further determine the user identity by merging the user's instances or appearances in the user identity space, based on user's reaction to content recommendation (S410).

That is, to identify a user in a household, all the user's appearances in the user identity space need to be merged, because the user identity space may catch a number of instances of the same identity with different time, position and content interests. The user behavior data, such as strength detected in remote control usage and the key press pattern, may be used to detect similar user instances and to link these similar instances together. Such merging helps to reconstruct the entire range of the user preferences, which can be used for new recommendation directions for the user.

More particularly, the user identity analyzer 308 may select two (2) user identities (denoted by e, f) among the multiple instances of the user identities provided by the sensing data processing module 306, with the highest probability p(e) and p(f). Further, the user identity analyzer 308 may obtain the recommendation list R(e) and R(f) from recommendation engine 310.

Further, the user identity analyzer 308 may build the current recommendation list by selecting part of the top recommendations from R(e)−[R(e)∩R(f)], and part of the top recommendations from R(f)−[R(e)∩R(f)]; the corresponding proportion percentage are renormalized values $$\frac{p(e)}{p(e) + p(f)}$$

and $$\frac{p(f)}{p(e) + p(f)}.$$

The new recommendation list may then be presented to the user such that the user's selection can be obtained. The user's selection on e or f may be used to verify the guessed user identities and to correspondingly update the mixture Gaussian model as previously described.

On the other hand, if the user chooses to change the content category manually, which means that none of the current recommendation matches the user's preference and the user is willing to explicitly express his/her preference. Such types of inputs may be given higher weights in adjusting the user identity model, e.g., the mixture Gaussian model.

After the user identity or identities are determined (S410), the process continues to S408 for another iteration such that the user identity can be either determined with a high confidence (dominant) or confirmed with the user's selections. That is, this process is a progressive user identification model allowing the user's inputs into the model adjustment process until a dominant identity is identified. This process can be terminated unless something new happens to wake up the process again. For example, the user may choose to change the content category manually, which means either the user is developing a new interest which is beyond the major interests learned from the user's past TV viewing history, or the remote control 104 maybe handed to another user, who may have different preferences. Other circumstances may also be included.

By using the disclosed systems and methods, many advantageous applications can be implemented, such as a smart remote control that can work seamlessly with the TV to identify the user identity. The disclosed systems and methods combine together the sensing data collected from the built-in sensors and the user's behavior models on both TV and remote control, and TV's recommendation capability into a comprehensive user-sensing remote control framework.

The disclosed systems and methods may also be used to bring personalized TV watching experience into reality, which makes the content delivery optimized to the user's specific taste. Other applications, advantages, alternations, modifications, or equivalents to the disclosed embodiments are obvious to those skilled in the art.

What is claimed is:

1. A method for a user-sensing remote control system including a TV and a remote control, comprising:
   obtaining sensing data from a plurality of sensors in the remote control related to a user of the remote control;
   pre-processing the sensing data;
   determining a user identity space using a predetermined statistical algorithm, wherein the user identity space contains a plurality of possible user identities of the user among a group of users of the TV and the remote control, and each user identity has multiple dimensions of parameters based on a plurality of sensors;
   calculating a probability of each user identity in the user identity space;
   determining whether there is a dominant possible user identity among the plurality of possible user identities with a probability of user identity greater than a predetermined threshold;
   when it is determined that there is no dominant possible user identity, merging at least two possible user identities from the user identity space and updating the user identity space based on the merged possible user identities and the user's selection to a new recommendation list created based on the at least two possible user identities until there is a dominant possible user identity; and
   when it is determined that there is a dominant possible user identity, presenting the dominant possible user identity as the identity of the user to other applications.

2. The method according to claim 1, further including:
   detecting that the user picks up the remote control; and
   determining user behavior based on a key transferring pattern among key nodes, wherein the key transferring pattern includes key node transitions from an originating key node to a next key node and respective probabilities, and the key nodes include at least a digit key node, a menu key node, a direction key node, and an enter key node.

3. The method according to claim 1, wherein pre-processing the sensing data further includes:
   classifying the user into one of a number of predetermined categories based on the sensing data based on members of household,
   wherein the predetermined categories are based on age and sex information of the user and include (Kid, Male); (Kid, Female); (Teenager, Male); (Teenager, Female); (Adult, Male); (Adult, Female); (Elder, Male); and (Elder, Female).

4. The method according to claim 3, further including:
   classifying the user into a specific person based on the sensing data and also as a function of time.

5. The method according to claim 1, wherein pre-processing the sensing data further includes:
   performing a quantization operation to map certain sensing data into a pre-defined fixed-size data set.

6. The method according to claim 5, wherein pre-processing the sensing data further includes:
   performing a dimension reduction operation using a knowledge base whose parameters are obtained from an early stage training process, such that a range of the user identity space can be substantially narrowed.

7. The method according to claim 6, wherein the sensing data include multiple types of observations and determining the user identity space further includes:
   combining the multiple types of observations into the user identity space using a mixture Gaussian algorithm as the predetermined statistical algorithm.

8. The method according to claim 1, wherein:
   the plurality of sensors are inside the remote control; and
   the plurality of sensors include at least an accelerometer, gyroscope, depth sensor, and infrared optical sensor.

9. The method according to claim 7, further including:
   calculating the probability that the user identity $X_t$ at time t as $$P(X_t) = \sum_{i=1}^{K} w_{i,t} \frac{1}{\sqrt{2\pi}\,\sigma_i} e^{-\frac{1}{2}(X_t - \mu_{i,t})^T \sum^{-1} (X_t - \mu_{i,t})},$$

where K is total number of Gaussian distributions and K>1, i is number of the distribution, $w_{i,t}$ is the normalized weight, $\mu_i$ and $\sigma_i$ are the mean and the standard deviation of the i-th distribution;
   sorting the K distributions based on the value of w/σ into an ordered list; and
   keeping distributions with highest possibilities of the K distributions on top of the ordered list.

10. The method according to claim 1, wherein selecting one or more possible user identities from the user identity space and updating the user identity space until there is a dominant possible user identity further include:

selecting two possible user identities with highest probabilities of user identity;
merging the two possible user identities to build the new recommendation list for the user;
obtaining an input from the user of the remote control;
when the input from the user is a selection from the new recommendation list, using a content category selected by the user to update the predetermined statistical algorithm to select the dominant possible user; and
when the input from the user is a content category unrelated to the new recommendation list, using the content category as an indication of user preference for another user.

11. The method according to claim 10, wherein, provided that the two user identities are denoted by e and f with the highest probabilities p(e) and p(f), the merging further includes:
obtaining a recommendation list R(e) and a recommendation list R(f) corresponding to the e and f, respectively; and
building a current recommendation list by selecting part of top recommendations from R(e)−[R(e)∩R(f)], and part of top recommendations from R(f)−[R(e)∩R(f)], with corresponding renormalized proportion percentage of $$\frac{p(e)}{p(e)+p(f)}$$

and $$\frac{p(f)}{p(e)+p(f)},$$

respectively.

12. A user-sensing remote control system including a remote control and a TV, comprising:
a plurality of sensors configured in the remote control for obtaining sensing data related to a user of the remote control;
a sensing data processing module configured to pre-process the sensing data and to determine a user identity space using a predetermined statistical algorithm, wherein the user identity space contains a plurality of possible user identities of the user among a group of users of the TV and the remote control, and each user identity has multiple dimensions of parameters based on a plurality of sensors;
a recommendation engine configured to provide one or more recommendation list on the TV to the user; and
a user identity analyzer configured to:
calculate a probability of each user identity in the user identity space;
determine whether there is a dominant possible user identity among the plurality of possible user identities with a probability greater than a predetermined threshold;
when it is determined that there is no dominant possible user identity, merge at least two possible user identities from the user identity space based on the merged possible user identities and the user's selection to a new recommendation list created based on the at least two possible user identities and update the user identity space until there is a dominant possible user identity; and
when it is determined that there is a dominant possible user identity, present the dominant possible user identity as the identity of the user to other applications.

13. The user-sensing remote control system according to claim 12, wherein the remote control is further configured to:
detect that the user picks up the remote control; and
determine user behavior based on a key transferring pattern among key nodes, wherein the key transferring pattern includes key node transitions from an originating key node to a next key node and respective probabilities, and the key nodes include at least a digit key node, a menu key node, a direction key node, and an enter key node.

14. The user-sensing remote control system according to claim 12, wherein the sensing data processing module is configured to:
classify the user into one of a number of predetermined categories based on the sensing data based on members of household,
wherein the predetermined categories are based on age and sex information of the user and include (Kid, Male); (Kid, Female); (Teenager, Male); (Teenager, Female); (Adult, Male); (Adult, Female); (Elder, Male); and (Elder, Female).

15. The user-sensing remote control system according to claim 14, wherein the sensing data processing module is further configured to:
classify the user into a specific person based on the sensing data and also as a function of time.

16. The user-sensing remote control system according to claim 12, wherein the sensing data processing module is configured to:
perform a quantization operation to map certain sensing data into a pre-defined fixed-size data set.

17. The user-sensing remote control system according to claim 16, wherein the sensing data processing module is further configured to:
perform a dimension reduction operation using a knowledge base whose parameters are obtained from an early stage training process, such that a range of the user identity space can be substantially narrowed.

18. The user-sensing remote control system according to claim 17, wherein the sensing data include multiple types of observations and the sensing data processing module is further configured to:
combine the multiple types of observations into the user identity space using a mixture Gaussian algorithm as the predetermined statistical algorithm.

19. The user-sensing remote control system according to claim 12, wherein:
the plurality of sensors are inside the remote control; and
the plurality of sensors include at least an accelerometer, gyroscope, depth sensor, and infrared optical sensor.

20. The user-sensing remote control system according to claim 18, wherein the sensing data processing module is further configured to:
calculating the probability that the user identity $X_t$ at time t as $$P(X_t) = \sum_{i=1}^{K} w_{i,t} \frac{1}{\sqrt{2\pi}\,\sigma_i} e^{-\frac{1}{2}(X_t-\mu_{i,t})^T \sum^{-1}(X_t-\mu_{i,t})},$$

where K is total number of Gaussian distributions and K>1, i is number of the distribution, $w_{i,t}$ is the normalized weight, $\mu_t$ and $\sigma_i$ are the mean and the standard deviation of the i-th distribution;
sort the K distributions based on the value of w/σ into an ordered list; and keep distributions with highest possibilities of the K distributions on top of the ordered list.

21. The user-sensing remote control system according to claim 12, wherein the user identity analyzer is further configured to:
   select two possible user identities with highest probabilities of user identity;
   merge the two possible user identities to build the new recommendation list for the user;
   obtain an input from the user of the remote control;
   when the input from the user is a selection from the new recommendation list, use a content category selected by the user to update the predetermined statistical algorithm to select the dominant possible user; and
   when the input from the user is a content category unrelated to the new recommendation list, use the content category as an indication of user preference for another user.

22. The user-sensing remote control system according to claim 21, wherein, provided that the two user identities are denoted by e and f with the highest probabilities p(e) and p(f), to merge the two possible user identities, the user identity analyzer is further configured to:
   obtain a recommendation list R(e) and a recommendation list R(f) corresponding to the e and f, respectively, from the recommendation engine; and
   build a current recommendation list by selecting part of top recommendations from R(e)−[R(e)∩R(f)], and part of top recommendations from R(f)−[R(e)∩R(f)], with corresponding renormalized proportion percentage of $$\frac{p(e)}{p(e)+p(f)}$$

and $$\frac{p(f)}{p(e)+p(f)},$$

respectively.

* * * * *